United States Patent
Hebbale et al.

[11] Patent Number: 6,165,097
[45] Date of Patent: Dec. 26, 2000

[54] POWERTRAIN WITH A SIX SPEED PLANETARY TRANSMISSION

[75] Inventors: Kumaraswamy V. Hebbale; Sekhar Raghavan; Patrick Benedict Usoro, all of Troy, Mich.

[73] Assignee: General Motors Corporation, Detroit, Mich.

[21] Appl. No.: 09/442,310

[22] Filed: Nov. 22, 1999

[51] Int. Cl.$^7$ .................................................. F16H 3/66
[52] U.S. Cl. ..................... 475/280; 475/284; 475/288; 475/325
[58] Field of Search .................... 475/280, 284, 475/325, 288

[56] References Cited

U.S. PATENT DOCUMENTS

| | | | |
|---|---|---|---|
| 3,946,623 | 3/1976 | Murakami et al. | 475/280 |
| 4,638,688 | 1/1987 | Hiraiwa | 475/284 |
| 5,141,477 | 8/1992 | Oshidari | 475/280 |
| 5,567,201 | 10/1996 | Ross | 475/280 |
| 5,830,102 | 11/1998 | Coffey | 475/285 |
| 5,951,432 | 9/1999 | Wehking et al. | 475/280 |

*Primary Examiner*—Sherry Estremsky
*Attorney, Agent, or Firm*—George A. Grove

[57] ABSTRACT

A powertrain includes an engine and torque converter arranged to provide input power to a six speed planetary transmission. The transmission includes a simple planetary gear set and a compound planetary gear set that are selectively interconnected by a pair of fluid-operated clutch mechanisms. Two other selectively engageable fluid-operated clutch mechanisms and three selectively engageable fluid-operated brake mechanisms are provided to control the power input and reaction within the planetary transmission. The clutch mechanisms and the brake mechanisms are engaged in combinations of three to provide six forward speed ratios and at least one reverse speed ratio between a transmission input shaft and a transmission output shaft.

4 Claims, 1 Drawing Sheet

| GEAR | RATIO | 30 | 32 | 26 | 28 | 34 | 36 | 38 |
|---|---|---|---|---|---|---|---|---|
| REV | -2.41 | X | | | X | X | | |
| REV (2) | -1.12 | | X | | X | X | | |
| 1st | 3.29 | | X | | X | | X | |
| 2 nd | 2.08 | X | | | X | | X | |
| 3 rd | 1.32 | X | | X | | | X | |
| 4 th | 1.00 | X | | X | X | | | |
| 5 th | 0.71 | X | | X | | | | X |
| 6 th | 0.53 | | X | X | | | | X |

X = ENGAGED 6,165,097

POWERTRAIN WITH A SIX SPEED PLANETARY TRANSMISSION

TECHNICAL FIELD

This invention relates to power transmissions and more particularly to planetary-type transmissions providing six forward speed ratios and at least one reverse ratio.

BACKGROUND OF THE INVENTION

In an effort to improve the overall performance of a vehicle while also reducing the mass of the vehicle, the number of speed ratios available through the transmission is increased. This permits a more efficient use of the engine operating range while also reducing the size of the engine. The increased number of speed ratios allows for a higher low gear ratio which will result in a reduced size torque converter.

The number of forward speed ratios in power transmissions has increased from two to five over a number of years. Many of the five speed transmissions incorporate two or three interconnected simple or compound planetary gear sets and five or six selectively engageable clutches or brakes. These transmissions quite often include one or more bridging clutches when two interconnected planetary gear sets are utilized. One example of this type of power transmission can be seen in U.S. Pat. No. 5,830,102 issued to Coffey on Nov. 3, 1998.

Currently, many manufacturers are considering increasing the number of ratios to six or seven. These transmissions generally contain three planetary gear sets. One such transmission is seen in U.S. Pat. No. 3,946,623 issued Mar. 30, 1976. This prior art transmission incorporates four interconnected planetary gear sets, three clutches and four brakes when more than five speed ratios are to be attained.

A six speed planetary transmission having two simple planetary gear sets is disclosed in U.S. Ser. No. 09/383,429 filed Aug. 27, 1999 and assigned to the assignee of this application. Other six speed planetary transmissions having a simple planetary gear set and a compound planetary gear set are disclosed in co-pending U.S. Ser. Nos. 09/442,309, 09/442,308 and 09/442,307 all filed Nov. 22, 1999.

SUMMARY OF THE INVENTION

It is an object of the present invention to provide an improved multi-speed power transmission.

In one aspect of the present invention, the power transmission provides six forward speed ratios and a reverse ratio. In another aspect of the present invention, the transmission incorporates two planetary gear sets and seven friction devices. In yet another aspect of the present invention, one of the planetary gear sets is a simple planetary and the other gear set is a compound planetary.

In still another aspect of the present invention, the ring gear of the compound planetary is continually drivingly connected with the transmission output shaft. In a further aspect of the present invention, the planetary carrier of the compound gear set is selectively connectable with the ring gear of the simple planetary gear set and also with the planetary carrier of the simple planetary gear set. In yet a further aspect of the present invention, the planetary carrier and the ring gear of the simple planetary gear set are individually selectively connectable with the input shaft of the transmission.

DESCRIPTION OF AN EXEMPLARY EMBODIMENT

Figures 1, 2:
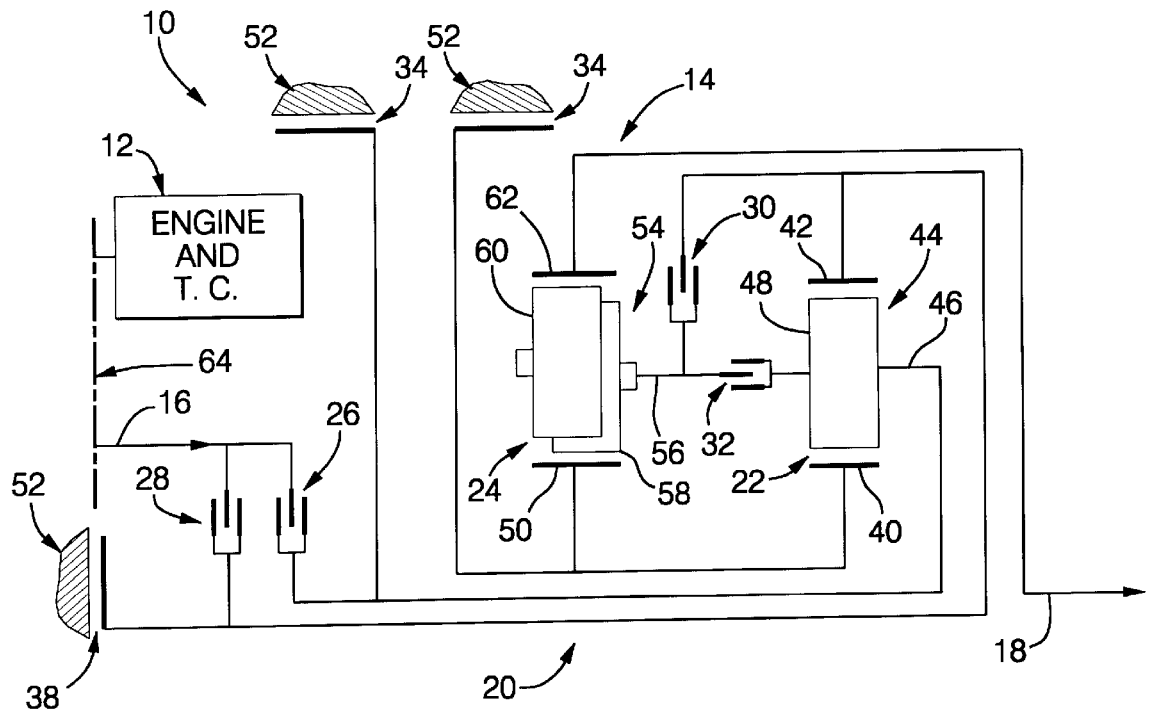
FIG. 1 is a schematic representation of a powertrain having a planetary transmission incorporating the present invention.
FIG. 2 is a table listing the speed ratios and the engagement state of the torque transmitting mechanisms for the powertrain shown in FIG. 1.

A powertrain 10 has a conventional engine and torque converter 12 and a multi-speed planetary transmission 14. The transmission 14 has an input shaft 16, an output shaft 18 and a planetary gear arrangement 20 operatively connected between the input shaft 16 and the output shaft 18. The planetary gear arrangement 20 incorporates a simple planetary gear set 22, a compound gear set 24, four selectively engageable torque transmitting mechanisms such as clutches 26, 28, 30, 32 and three selectively engageable torque transmitting mechanisms such as brakes 34, 36, 38. The simple planetary gear set 22 has three rotatable members including a sun gear member 40, a ring gear member 42 and a carrier assembly member 44 that incorporates a cage 46 and a plurality of pinion gear members 48 that mesh with both the sun gear member 40 and the ring gear member 42.

The sun gear member 40 is connected with the brake 36 and to a sun gear 50 of the compound planetary gear set 24. Selective actuation of the brake 36 connects both sun gear member 40 and sun gear member 50 with a stationary component of a transmission housing 52. The ring gear 42 is connected with the clutch 28, the clutch 30 and the brake 38. The carrier assembly member 46 is connected with the clutch 26, the clutch 32 and the brake 34. Selective actuation of the clutch 28 connects the ring gear member 42 with the input shaft 16; selective actuation of the brake 38 connects the ring gear member 42 with the transmission housing 52; and selective actuation of the clutch 30 connects the ring gear member 42 with a carrier assembly member 54 of the compound planetary gear set 24. The selective actuation of the clutch 26 connects the carrier assembly member 44 with the input shaft 16; selective actuation of the clutch 32 will interconnect the carrier assembly member 44 with the carrier assembly member 54 of the compound planetary gear set 24; and selective actuation of the brake 34 will connect the carrier assembly member 44 with the transmission housing 52.

The carrier assembly member 54 has a cage 56 on which is rotatably mounted meshing pinion gear members 58 and 60. The pinion gear member 58 meshes with the sun gear member 50, and the pinion gear member 60 meshes with a ring gear member 62 of the compound planetary gear set 24. The ring gear member 62 is continuously connected with the output shaft 18. As is apparent from the above description, the compound gear set 24 has three rotatable members defined by the sun gear 50, the planetary carrier assembly 54 and the ring gear 62.

During operation of the powertrain 10, the engine and torque converter 12 drive the input shaft 16 through a conventional transfer drive mechanism 64, such as a chain or transfer gears. The torque converter can include a conventional torque converter clutch if desired. The clutches 26, 28, 30, 32 and the brakes 34, 36, 38 are preferably conventional fluid-operated mechanisms, the design of which is well known in the art of power transmission. The clutches and brakes are preferably controlled by a conventional electro-hydraulic control system that utilizes a conventional electronic control unit that includes a programmable digital computer. The control system establishes the shift sequence of the clutches and brakes from input signals provided by the operator (such as throttle position and manual shift controls)

and conventional sensor devices (such a speed sensors). The clutches 26, 28, 30, 32 and the brakes 34, 36, 38 are selectively engaged in combinations of three to establish six forward speed ratios and one reverse ratio.

The truth table shown in FIG. 2 describes the operating sequence of the clutches and brakes to establish the forward and reverse speed ratios. The ratio numbers set forth in the table of FIG. 2 are dependent on the ring gear member to sun gear member teeth ratios. In the example shown, the tooth ratio for the ring gear member 42 to the sun gear member 40 is 1.72. The tooth ratio for the ring gear member 62 to the sun gear member 50 is 1.93. The ratios in FIG. 2 are speed ratios that are determined by the input speed (shaft 16) divided by the output speed (shaft 18).

To establish the reverse speed ratio, the clutches 28, 30 and the brake 34 are engaged. This establishes the carrier assembly member 44 as a reaction member in the planetary gear arrangement 20 and the ring gear member 42 and the carrier assembly member 54 as input members. The sun gear member 50 is also an input member to the compound gear set 24. The sun gear member 50 is driven in reverse at a sufficiently high speed, dependent on the tooth ratio of the simple planetary gear set 22, such that the resultant speed of the ring gear member 62 is in reverse. Both of the planetary gear sets 22 and 24 contribute to the reverse speed ratio.

A neutral condition is established when only the clutch 28 is engaged. To establish the first forward ratio, the clutches 28 and 32 and the brake 36 are engaged. This establishes the sun gear members 40 and 50 as a reaction member and the ring gear member 42 as an input member. Both planetary gear sets 22 and 24 contribute to the first forward speed ratio.

The second forward speed ratio is established by the engagement of the clutches 28 and 30 and the brake 36. During the first to second interchange, only the clutches 30 and 32 are swapped. In the second speed ratio, the carrier assembly member 54 is an input member and the sun gear member 50 is a reaction member. The second forward speed ratio is determined solely by the compound planetary gear set 24.

To establish the third forward speed ratio, the clutches 26 and 30 and the brake 36 are engaged. Both sun gear members 40 and 50 are reaction members in the planetary gear arrangement 20. The carrier assembly member 44 is an input member. During the second to third interchange, only the clutches 26 and 28 are swapped. The ring gear member 42 is overdriven such that the carrier assembly member 54 is also overdriven. This results in an underdrive at the ring gear member 62 that is at a lower speed ratio than the second forward speed ratio. Both of the planetary gear sets 22 and 24 contribute to the third forward speed ratio.

The fourth forward speed ratio is established by the engagement of the clutches 26, 28 and 30. This establishes a direct drive condition in the planetary gear arrangement 20. Only the clutch 28 and the brake 36 are swapped during the third to fourth interchange.

The fifth forward speed ratio is established by the engagement of the clutches 26 and 30 and the brake 38. This establishes the ring gear member 42 and the carrier assembly member 54 as reaction members in the planetary gear arrangement 20 and the carrier assembly member 44 as an input member. This results in the sun gear members 40 and 50 being overdriven relative to the input shaft 16 such that the ring gear member 62 is overdriven relative to the input shaft 16. The fifth forward speed ratio is determined by both planetary gear sets 22 and 24. Only the brake 38 and the clutch 28 are swapped during the four/five ratio interchange.

The sixth forward speed ratio is established by the engagement of clutches 26 and 32 and the brake 38. The ring gear 42 remains as the reaction member and the carrier assembly members 44 and 54 are both input members. The simple planetary gear set 22 contributes an overdrive input to the sun gear member 50 of the compound planetary gear set 24, and the carrier assembly member 54 provides a direct input to the compound planetary gear set 24. This results in an overdrive ratio at the ring gear 62. Both planetary gear sets 22 and 24 contribute to the sixth forward speed ratio. Only the clutches 30 and 32 are swapped during the five/six ratio interchange.

A second reverse speed ratio is also available through the engagement of the clutches 28 and 32 and the brake 34. This will permit a reverse speed ratio of 1.12. This will be useful if a high reverse speed is desired. It would result in a single transition shift through the release of clutch 30 and the engagement of clutch 32. With clutch 32 and brake 34 engaged, both of the planetary carrier assemblies 44 and 54 are established as reaction devices in the planetary gear arrangement 20. If this reverse ratio is utilized, both planetary gear sets 22 and 24 contribute to the overall ratio.

From the above description it should now be apparent to those skilled in the art that both of the planetary gear sets 22 and 24 are combined in four of the forward speed ratios and in both of the available reverse speed ratios. The only speed ratio that utilizes a single planetary gear set is the second forward speed ratio.

What is claimed is:

1. A planetary transmission comprising:
   an input shaft;
   an output shaft;
   a simple planetary gear set having a sun gear member, a ring gear member and a carrier assembly member;
   a compound planetary gear set having a sun gear member, a ring gear member and a carrier assembly member, said sun gear member being continuously connected with said sun gear member of said simple planetary gear set, and said ring gear being continuously connected with said output shaft;
   a first selectively engageable clutch to selectively connect said carrier assembly member of said simple planetary gear set with said input shaft;
   a second selectively engageable clutch to selectively connect said ring gear member of said simple planetary gear set with said input shaft;
   a third selectively engageable clutch to selectively interconnect said ring gear member of said simple planetary gear set and said carrier assembly member of said compound planetary gear set;
   a fourth selectively engageable clutch to selectively interconnect said carrier assembly member of said simple planetary gear set and said carrier assembly member of said compound planetary gear set;
   a first selectively engageable brake to selectively connect said carrier assembly member of said simple planetary gear set with a stationary member of said transmission;
   a second selectively engageable brake to selectively connect both of said sun gear members with the stationary member of said transmission;
   a third selectively engageable brake to selectively connect said ring gear member of said simple planetary gear set with the stationary member of said transmission; and
   said four selectively engageable clutches and three selectively engageable brakes being engageable in combination of two clutches and one brake to establish five forward speed ratios and at least one reverse speed ratio between said input shaft and said output shaft and in combination of three clutches to establish a direct forward ratio.

2. A power transmission comprising:

an input shaft;

an output shaft;

a simple planetary gear set having first, second and third rotatable members;

a compound planetary gear set having fourth, fifth and sixth rotatable members;

said first rotatable member and said fourth rotatable member being continuously interconnected for common rotation, said fifth member being continuously connected with said output shaft;

a first torque transmitting mechanism selectively connecting said second rotatable member with said input shaft;

a second torque transmitting mechanism selectively connecting said third rotatable member with said input shaft;

a third torque transmitting mechanism selectively interconnecting said third rotatable member and said sixth rotatable member;

a fourth torque transmitting mechanism selectively interconnecting said second rotatable member and said sixth rotatable member;

a fifth torque transmitting member selectively connecting said third rotatable member with a stationary component of the power transmission;

a sixth torque transmitting member selectively connecting said first and fourth rotatable members with said stationary component; and a seventh torque transmitting mechanism selectively connecting said second rotatable member with said stationary component.

3. A power transmission comprising:

an input shaft;

an output shaft;

a first planetary gear set and a second planetary gear set;

first means for continuously interconnecting a first member of each planetary gear set;

second means for continuously connecting a second member of said second planetary with said output shaft;

third means for independently selectively connecting a second member and third member of said first planetary gear set with said input shaft;

fourth means for independently selectively interconnecting said second and third members of said first planetary gear set with a third member of said second planetary gear set;

fifth means for independently selectively connecting said first members of both planetary gear sets with a stationary component in said transmission, said second member of said first planetary gear set with said stationary component, and said third member of said first planetary gear set with said stationary component; and said first, second, third, fourth, and fifth means being operated to provide four forward speed ratios and one reverse speed ratio utilizing combination of both said planetary gear sets, one forward speed ratio utilizing only said second planetary gear set, and one forward speed ratio that is a direct drive.

4. The power transmission defined in claim 3 wherein:

said first planetary gear set is a simple planetary gear set having first, second, and third rotatable members;

said second planetary gear set is a compound planetary gear set having first, second, and third rotatable members;

said third means comprises a first selectively operated torque transmitting mechanism, and a second selectively operated torque transmitting mechanism;

said fourth means comprises a third selectively operated torque transmitting mechanism, and a fourth selectively operated torque transmitting mechanism; and said fifth means comprises a fifth selectively operated torque transmitting mechanism, a sixth selectively operated torque transmitting mechanism, and a seven th selectively operated torque transmitting mechanism.

* * * * *